April 20, 1954   S. J. RAITERI   2,675,704
GAUGE VALVE
Filed July 12, 1949

Inventor
Stephen J. Raiteri
By
Wooster & Davis   Attorneys

Patented Apr. 20, 1954

2,675,704

UNITED STATES PATENT OFFICE 2,675,704

GAUGE VALVE

Stephen J. Raiteri, Stamford, Conn.

Application July 12, 1949, Serial No. 104,267

6 Claims. (Cl. 73—332)

This invention relates to valves, and particularly to a dispensing valve associated with a gauge glass, and has for an object to provide an improved and simple valve structure which will control the dispensing of liquids from a container, such, for example, as coffee from a coffee urn, and which will provide communication between the gauge glass and the urn to indicate the level of liquid in the urn or other container, and which will also control this communication so that should the glass be broken the communication may be shut off to prevent loss of liquid through the broken glass and also to permit renewal of the glass.

It is also an object to provide a valve of this character in which, should the glass be broken and it become necessary to cut off connection from the glass to the container, the valve may be used for dispensing or drawing off liquid from the container while communication to the glass is so cut off.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

Figure 1:
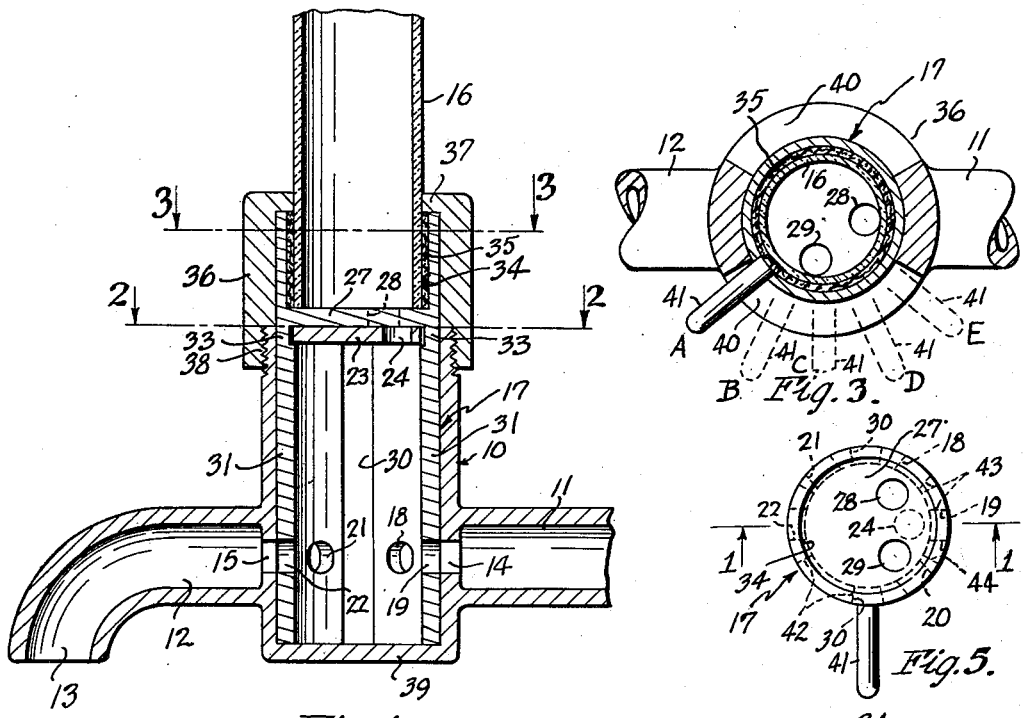
Fig. 1 is a vertical section through the valve assembled showing the valve in position where liquid may be drawn from the container, but communication with the gauge glass is cut off, the section through the movable valve member being substantially on the plane of line 1—1 of Fig. 5.

The device comprises a hollow body or casing 10, preferably in the form of an upright hollow cylinder, connected on one side by an inlet conduit 11 with a container for the liquid to be dispensed and controlled, such, for example, as a coffee urn (not shown), and an outlet conduit 12 from another side of the casing, preferably the diametrically opposite side, to the faucet outlet 13 for discharging into a cup or other receptacle. The conduit passages also include openings 14 and 15 leading to the interior of the casing. Secured at its lower end to the upper part of the valve is a gauge glass 16 which, when in communication with the interior of the container, such as the coffee urn, indicates the level of the liquid in this container.

Mounted within the body or casing is a movable valve member 17, preferably in the general form of a hollow cylindrical sleeve, and this valve member controls the drawing of coffee or other liquid from the container or urn and also the connection from the container or urn to the lower end of the gauge glass. For these purposes the side walls of the valve member are provided with a series of openings or passages 18, 19, 20, 21 and 22 on the level of the inlet and outlet openings or passages 14 and 15 in the body or casing, and they are so located as to provide different effects or control, as will later be described. The body or casing 10 is provided at a location above these inlet and outlet conduits with a transverse wall 23 provided with an opening or passage 24 through it, and outwardly of this passage is also provided with a pair of arcuate slots 25, separated at their ends by the connecting wall 26. This opening 24 provides communication from the interior of the body or casing to the open lower end of the gauge glass 16.

The movable valve member 17 also has a transverse wall or partition 27 located at one side of the wall 23 of the casing. In the arrangement illustrated it is located at the top of and rests on this wall 23, and it is provided with a pair of spaced openings or passages 28 and 29 adapted to be brought into alignment with the opening or passage 24 by movements of the valve member 17. For mounting the valve member in the casing it is provided with a pair of diametrically opposite longitudinal slots 30 separating the valve sleeve into two arcuate longitudinal segments 31. At the upper end of the slots 30 are transverse or peripheral slots 32 just below the wall 27 forming a reduced portion 33 located in the arcuate slots 25, as shown in Fig. 2, to permit turning movements of the valve member 17 in the body 10. The lower end of the gauge glass 16 is secured to the valve by its lower end being seated in a socket 34 in the upper end of the valve member 17, and it is held tightly by means of a suitable packing sleeve 35 of fibrous or other suitable material. The valve member 17 is mounted in the body or casing 10 by inserting the segments 31 downwardly through the slots 25 in the transverse wall 23 to the position of Fig. 1, with the reduced connecting portions 33 in the slots. In this position the member 17 may be given limited turning movements in opposite directions until the opposite ends of the narrow portions 33 engage the ends of the slots 25. The valve member is held in the casing by means of a cap 36 provided with an inwardly directed flange 37 at its upper end overlapping the end of the valve member, and threaded at its lower end portion, as indicated at 38, onto the upper end of the body or casing. The valve member 17 is preferably of such a length as to rest at its lower end on the bottom wall 39 of the casing. The cap 36 is provided with arcuate openings 40 in its opposite side walls thru which the upper end portion of the movable valve member 17 may be gripped and turned to different angular positions. These movements may be effected by gripping the valve member direct, or if preferred, it may be provided with a handle 41 secured to the valve member and projecting through one of these openings 40 for turning the valve member.

Figure 3:
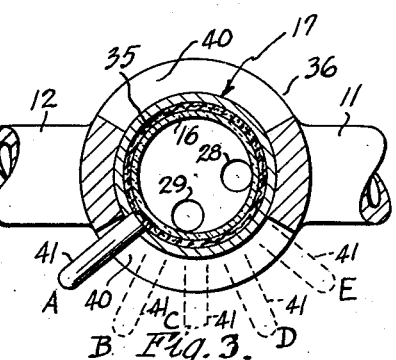
Fig. 3 is a transverse section substantially on line 3—3 of Fig. 1, but showing the movable valve member in a different position where the gauge glass is in communication with the container, but the draw-off conduit from the valve is closed.
Figure 5:
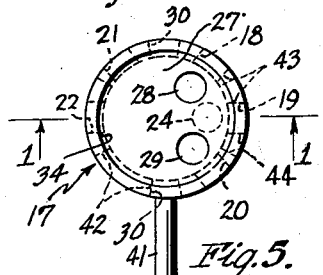
Fig. 5 is a top plan view of the movable valve member removed from the body or casing.
Figure 2:
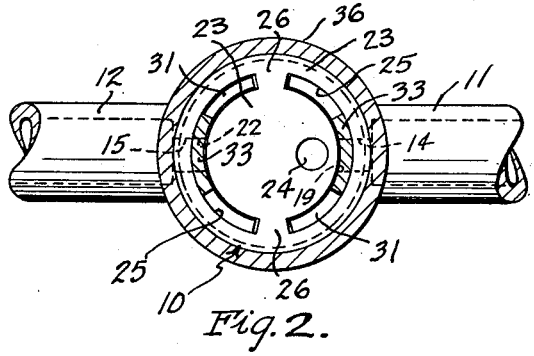
Fig. 2 is a transverse section substantially on line 2—2 of Fig. 1.
Figure 6:
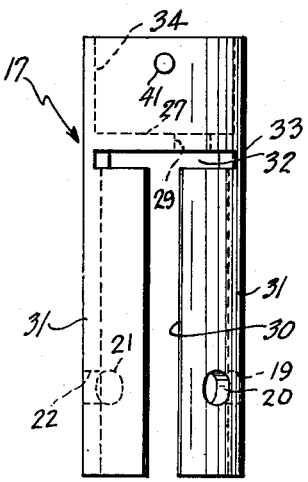
Fig. 6 is a side elevation thereof.
Figure 4:
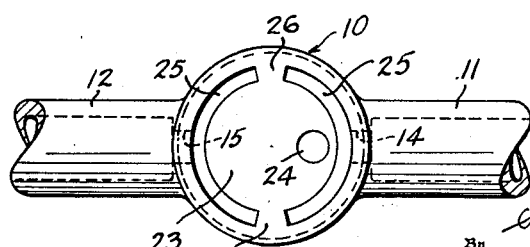
Fig. 4 is a top plan view of the valve body or casing with the movable valve member removed.

The operation of the device is as follows:

In the position of Fig. 1, the valve member 17 is an intermediate position corresponding to the position of the handle 41 in position C of Fig. 3, and also corresponding to the position of Fig. 5, although the valve body or casing is not shown in this figure. In this position, the inlet and outlet conduits 11 and 12 are in communication, and liquid may be withdrawn from the container or urn. This is because the openings or passages 19 and 22 in the valve member 17 are in alignment with the inlet and outlet passages 14 and 15. In this position, however, communication of the urn with the gauge glass 16 is cut off because neither of the openings 28 or 29 in the transverse wall 27 of the valve member is in alignment with the passage 24 through the transverse wall 23 of the valve body. This position is indicated in Fig. 5, in which the passage 24 is indicated in dotted lines intermediate the two passages 28 and 29. In this position, liquid may be drawn from the container or urn, even though the gauge glass 16 may be broken, without loss of liquid through this glass.

When the valve member 17 is in the full line position of Fig. 3 and the handle 41 is in the extreme left hand position indicated by the letter A, the gauge glass 16 is in communication with the urn but no liquid is being drawn from the urn. Communication from the glass to the urn is established when the opening or passage 28 through the wall 27 of the movable valve member is in alignment with the passage or opening 24 through the wall 23 of the valve body and the opening or passage 18 in the side of the valve member 17 is in alignment with the inlet conduit passage 14. However, as there is no corresponding passage in the diametrically opposite wall portion of the movable valve member, indicated by the numeral 42, Fig. 5, and this wall is over the outlet conduit opening 15, no liquid can pass from the valve to the outlet 12. This is the normal cut-off position permitting the gauge to indicate the level of liquid in the urn.

The effect of shifting the valve to the position where the handle 41 is in the intermediate position indicated by C of Fig. 3, is as described above, and is the position of Figs. 1, 2 and 5. If the handle 41 is shifted to the extreme right position indicated by the dotted line E in Fig. 3, then there is communication from the urn to the gauge glass 16 and the draw-off conduits are open, permitting the drawing of liquid from the urn. This is because in this position passage 29 in the movable valve member wall 27 is in alignment with the passage 24 in the wall 23 of the valve body, and the passages 20 and 21 in the diametrically opposite walls in the valve member 17 are in alignment with the inlet and outlet passages 14 and 15 respectively. When the movable valve member is in either of the intermediate positions between the positions indicated by A and C, of the handle 41 in Fig. 3, or intermediate the positions C and E, these two intermediate positions being indicated by the dotted lines B and D, both the communication from the urn to the gauge glass and the draw-off passages for liquid from the urn are cut off. This is because in the position indicated by the dotted line B, the portion of the side wall indicated at 43, Fig. 5, between the openings 18 and 19, is positioned over the inlet passage 14, thus cutting off the inlet from both the gauge glass and the outlet. When the valve is in the position indicated by the position of the handle at D, then the side wall, indicated at 44, between the openings 19 and 20, is over the inlet passage 14 and the same effect is secured.

It will be clear from the above that the valve is a very simple device, and that the movable valve member may be shifted by simple movements to a plurality of different positions, providing different results or effects as described. That is, in the position indicated by the letter A of Fig. 3, the urn is in communication with the gauge glass 16 while the outlet draw-off passage from the valve is closed. In the positions indicated by B and D, the inlet passage is cut off from both the gauge glass and the outlet passage. In the position indicated by C, the draw-off passages are open and the communication from the urn to the gauge glass is cut off. This is the position of Fig. 1 and is the position which permits drawing off of liquid from the urn, even should the gauge glass be broken. In the position indicated by E, both the draw-off passages and the communication from the urn to the gauge glass are open. The movable valve member may be readily removed from the valve body or casing for cleaning or renewal by merely removing the cap 36 and withdrawing member 17 from the casing.

Having thus set forth the nature of my invention, I claim:

1. A valve comprising an upright cylindrical hollow body provided with a transverse wall adjacent its upper end provided with a passage through it and spaced curved slots, inlet and outlet conduits connected to the body below said wall, a movable valve member comprising a sleeve provided with longitudinal slots leading from its lower end dividing the sleeve into curved segments, said segments being inserted through the curved slots and telescoping the body, a transverse wall in the valve member on top of the first wall and provided with spaced passages movable to and from alignment with the first passage by turning movements of the valve member, means for connecting the lower end of a gauge glass with the upper end of the valve, and said valve member segments being provided with control passages movable to and from alignment with the inlet and outlet conduits by turning movements of the valve member.

2. A valve comprising an upright cylindrical hollow body provided with a transverse wall adjacent its upper end provided with a passage through it and spaced curved slots, inlet and outlet conduits connected to the body below said wall, a movable valve member comprising a sleeve provided with longitudinal slots leading from its lower end dividing the sleeve into curved segments, said segments being inserted through the curved slots and telescoping the body and provided with control passages movable to and from alignment with the inlet and outlet conduits by turning movements of the valve member, said valve member being provided with a transverse wall on the upper side of the first wall provided with spaced passages movable to and from alignment with the first passage by turning movements of the valve member, said valve member being provided with an upwardly opening socket in its upper end above the transverse wall in said member, a gauge glass secured at its lower end in said socket, and a cap threaded onto the upper end of the body and overhanging the valve member to retain it in the body.

3. A valve of the character described comprising a casing, an inlet conduit connection to one side of the casing, an outlet conduit connection from another side of the casing, said casing being provided with a transverse wall above said conduits provided with a passage therethrough, a movable valve member comprising a sleeve mounted to turn in the casing and provided with passages in its side walls movable to and from alignment with said conduits by said turning movements, said valve member being also provided with a cross wall located at one side of and closely adjacent the transverse wall of the casing and provided with a passage movable to and from alignment with the passage in the transverse wall by turning movements of said member, and the valve member being provided with a socket in the upper end thereof on the opposite side of the transverse walls from the side wall passages and conduits to receive the lower end of a gauge glass, said passages in the cross walls when in alignment forming a communication between the socket and the interior of the casing.

4. A valve comprising an upright hollow body, inlet and outlet conduits connected with the side walls of said body, a movable valve member comprising an upright sleeve mounted for turning movements in the body, the side walls of said sleeve being provided with control passages movable to and from alignment with said conduits by turning movements of the sleeve, means for connecting the lower end of a gauge glass to the upper part of the valve, and said body and movable valve member being provided with superimposed cross walls between said gauge glass connecting means and the interior of the body having passages therethrough arranged to be brought into and out of alignment by movements of the valve member and when in alignment providing communication from the interior of the sleeve to the gauge glass.

5. A valve comprising an upright hollow body, inlet and outlet conduits connected with said body, a movable valve member comprising an upright sleeve mounted for turning movements in the body, the side walls of said sleeve being provided with control passages movable to and from alignment with said conduits by turning movements of the sleeve, said valve member being provided with a stationary socket to receive the lower end of a gauge glass for connecting it to the upper part of the valve, said body and valve member being provided with overlapped walls located between the socket and the interior of the body having passages therethrough brought into and out of alignment by movements of the valve member, said passages communicating respectively with the interior of the sleeve and the socket so that when in alignment they provide a connection from the interior of the sleeve to the gauge glass, when the sleeve is in position with the passages in the cross walls in alignment with the control passages in the sleeve are out of alignment with the outlet conduit and one of them is in alignment with the inlet conduit, and when in another position of the valve member the passages in the cross walls are out of alignment said control passages being in alignment with the inlet and outlet conduits.

6. A valve comprising a hollow body, inlet and outlet conduits connected with said body, a movable valve member in the body, means for connecting an end of a gauge glass to the valve comprising a fixed socket to receive said end, said body being provided with a wall between the socket and said conduits provided with an opening leading from the interior of the body to the socket, said valve member including walls provided with passages movable to and from alignment with the conduits and a pair of openings movable to and from alignment with the first opening to control flow of fluid through them to and from the interior of the body, and said passages and openings so arranged that when said valve member is in position with one of its associated openings in alignment with the body opening leading to the socket and valve member passages are out of alignment with the outlet conduit and one of these passages is in alignment with the inlet conduit, and when the valve member is in another position with the opening to the socket and the associated valve member openings out of alignment other valve member passages are in alignment with the inlet and outlet conduits and provide a communication between them.

References Cited in the file of this patent

UNITED STATES PATENTS

| Number | Name | Date |
|---|---|---|
| 350,510 | Stretch | Oct. 12, 1886 |
| 765,524 | Tyson | July 19, 1904 |
| 1,849,259 | Walker | Mar. 15, 1932 |